United States Patent
Horng et al.

(12)
(10) Patent No.: US 6,700,241 B1
(45) Date of Patent: Mar. 2, 2004

(54) POSITIONING DEVICE FOR PRESTRESSING MAGNET OF SPINDLE MOTOR

(75) Inventors: Alex Horng, Kaohsiung (TW); Tso-Kuo Yin, Kaohsiung Hsien (TW)

(73) Assignee: Sunonwealth Electric Machine Industry Co., Ltd., Kaohsiung (TW)

(*) Notice: Subject to any disclaimer, the term of this patent is extended or adjusted under 35 U.S.C. 154(b) by 31 days.

(21) Appl. No.: 10/304,761

(22) Filed: Nov. 27, 2002

(51) Int. Cl.[7] ............................................. H02K 11/00
(52) U.S. Cl. ................ 310/67 R; 310/90.5; 360/99.08; 360/99.07; 360/99.04
(58) Field of Search .............................. 310/67 R, 90.5, 310/51; 360/99.08, 99.07, 99.04; H02K 7/09

(56) References Cited

U.S. PATENT DOCUMENTS 5,994,803 A * 11/1999 Jung ........................... 310/51
6,300,695 B1 * 10/2001 Neal ........................... 310/68 D
6,340,854 B1 * 1/2002 Jeong .......................... 310/90
6,455,961 B1 * 9/2002 Higuchi ...................... 310/67 R

* cited by examiner

Primary Examiner—Nicholas Ponomarenko
Assistant Examiner—Leda T. Pham
(74) Attorney, Agent, or Firm—Bacon & Thomas, PLLC

(57) ABSTRACT

A positioning device for a prestressing magnet of a spindle motor includes a stator, a positing member, a prestressing magnet, a rotor and a metal casing. Combined with the prestressing magnet, the positioning member is fittingly secured to a generally axially extending surface at a selected position on the stator while the metal casing is secured to the rotor. After combining the stator with the rotor, the prestressing magnet is axially aligned with the metal casing. An axially magnetic force generated between the prestressing magnet and the metal casing maintains balanced rotation of the rotor.

5 Claims, 3 Drawing Sheets

POSITIONING DEVICE FOR PRESTRESSING MAGNET OF SPINDLE MOTOR

BACKGROUND OF THE INVENTION

1. Field of the Invention

The present invention is related to a positioning device for a prestressing magnet of a spindle motor and more particularly to the positioning device having an adjustable positioning member to thereby adjust a position of the prestressing magnet for balancing the spindle motor during rotation.

2. Description of the Related Art

Referring to FIG. 1, a conventional spindle motor 1 comprises a stator 10, a prestressing magnet 11, a bearing 12, a rotor 20, and a metal casing 21. The prestressing magnet 11 is attached to the stator 10 by adhesive while the bearing 12 is inserted into the rotor 20. A shaft 22 of the rotor 20 extends through the bearing 12 of the stator 10 to form the spindle motor 1. Axially aligned with the metal casing 21 of the rotor 20, the prestressing magnet 11 provides an axial magnet force to thereby cause balanced rotation of the rotor 20. Consequently, a gap width (a) formed between the prestressing magnet 11 and the metal casing 21 is inversely proportional to the magnetic force therebetween.

Referring to FIG. 2, another conventional spindle motor 1 comprises a stator 10, a prestressing magnet 11, a bearing 12, a rotor 20, and a metal casing 21. Formed with a neck portion 121 at its end, the bearing 12 is inserted into the stator 10. The prestressing magnet 11 is attached to the neck portion 121 of the bearing 12 to form a unit. A shaft 22 of the rotor 20 extends through the bearing 12 of the stator 10 to form the spindle motor 1. Axially aligned with the metal casing 21 of the rotor 20, the prestressing magnet 11 provides an axial magnetic force to thereby maintain the rotor 20 in balanced rotation. Consequently, a gap width (a') formed between the prestressing magnet 11 and the metal casing 21 is inversely proportional to the magnetic force therebetween.

Because the gap widths (a and a') formed between the prestressing magnet 11 and the metal casing 21 are fixed, the axially magnetic force therebetween cannot be adjustable. In other words, the magnetic force generated between the prestressing magnet 11 and the metal casing 21 cannot be increased or decreased according to product features. In order to adjust the magnetic force, an appropriate position of the prestressing magnet 11 on the stator 10 must be changed.

The present invention intends to provide a positioning device for a prestressing magnet of a spindle motor having an adjustable positioning member adapted to adjust a distance with respect to a rotor in such a way to mitigate and overcome the above problem.

SUMMARY OF THE INVENTION

The primary objective of this invention is to provide a positioning device for a prestressing magnet of a spindle motor having an adjustable positioning member fittingly combined with a stator to thereby adjust a distance of a position of the prestressing magnet with respect to a rotor.

The positioning device for a prestressing magnet of a spindle motor in accordance with the present invention mainly comprises a stator, a positioning member, a prestressing magnet, a rotor and a metal casing. Combined with the prestressing magnet, the positioning member is fittingly secured to a predetermined position on the stator while the metal casing is secured to the rotor. After combining the stator with the rotor, the prestressing magnet is axially aligned with the metal casing. An axial magnetic force generated between the prestressing magnet and the metal casing maintains balanced rotation of the rotor.

Another aspect of the present invention is that the positioning member is fittingly pressed to secure to a predetermined positioned formed on an outer circumference of a neck portion of a bearing or the stator.

Another aspect of the present invention is that the positioning member is fittingly pressed to secure to a predetermined position formed on an outer circumference of an axial tube.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein.

DETAILED DESCRIPTION OF THE INVENTION

Figure 1:
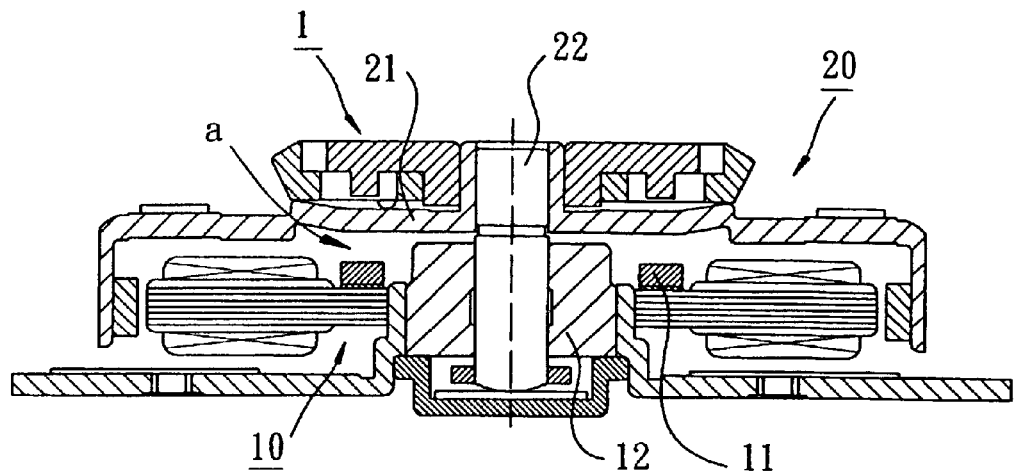
FIG. 1 is a partial sectional view of a conventional spindle motor in accordance with the prior art.
Figure 2:
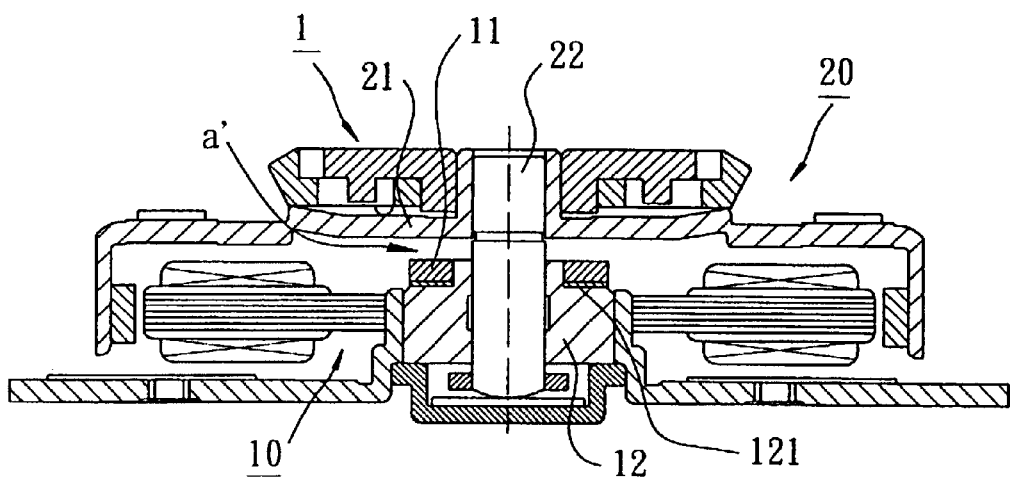
FIG. 2 is a partial sectional view of another conventional spindle motor in accordance with the prior art.

Referring now to the drawings, there are two embodiments of the present invention shown therein, all of which include generally a primary stator member and a secondary rotor member.

Figure 3:
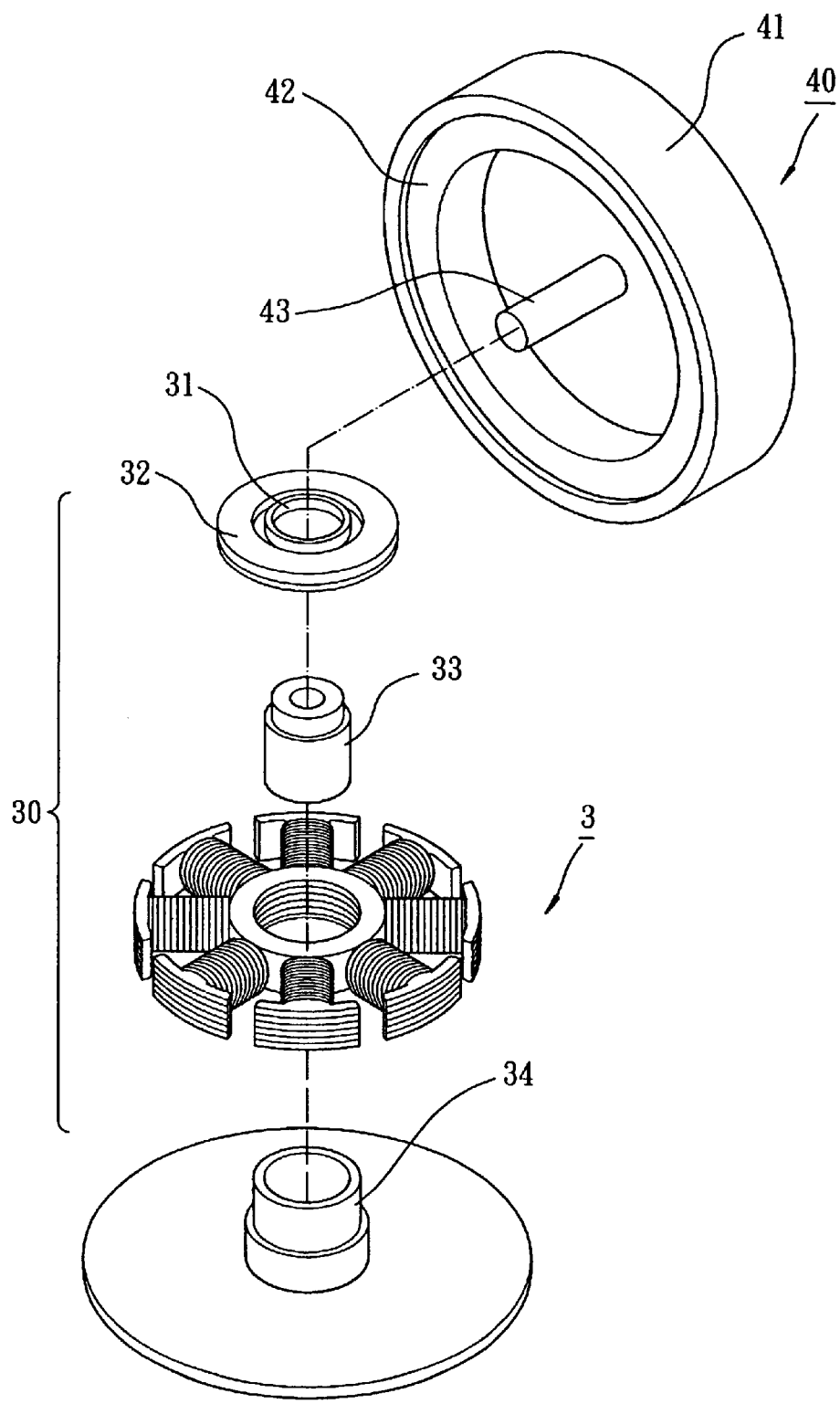
FIG. 3 is an exploded perspective view of a positioning device for a prestressing magnet of a spindle motor in accordance with a first embodiment of the present invention.
Figure 4:
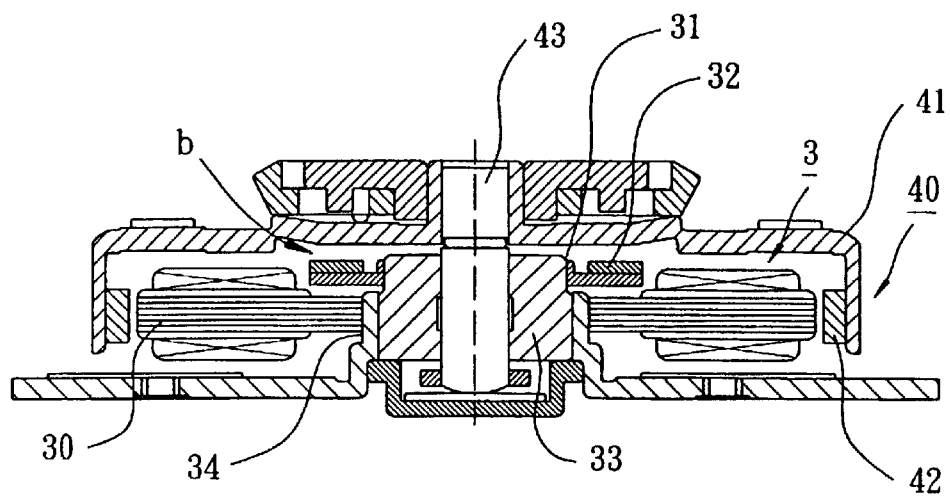
FIG. 4 is a sectional view of the positioning device for the prestressing magnet of the spindle motor in accordance with the first embodiment of the present invention.

Referring initially to FIGS. 3 and 4, a spindle motor, designated as numeral 3, in accordance with the first embodiment includes a stator designated as numeral 30, a positioning member designated as numeral 31, a prestressing magnet designated as numeral 32, a rotor designated as numeral 40, a metal casing designated as numeral 41, and a permanent magnet designated as numeral 42.

Referring again to FIGS. 3 and 4, a spindle motor 3 of the first embodiment comprises a stator 30, a positioning member 31, a prestressing magnet 32, a bearing 33, an axial tube 34, a rotor 40, a metal casing 41 and a magnet 42. The stator 30 includes a main body and a plurality of pole arms symmetrically surrounding the axial tube 34. Poles of the pole arms are used to generate an alternative radial magnetic field to thereby rotate the rotor 40. The positioning member 31 is attached to an end of the stator 30 and adapted to support the prestressing magnet 32 which is adapted to generate an axial magnetic field. Preferably, the prestressing magnet 32 is an annular magnet forming a regular and symmetric annular magnetic field. Meanwhile, the bearing 33 is inserted into the axial tube 34 of the stator 30 and adapted to receive a spindle 43 of the rotor 4. The bearing 33 further includes a neck portion at its one end.

Referring again to FIGS. 3 and 4, the rotor 40 includes the metal casing 41, and the magnet 42 which is adapted to generate a radial magnetic field. The metal casing 41 is consisted of an annular wall and a annular plate. The magnet 42 is attached to the annular wall of the metal casing 41.

Referring to FIG. 4, after combining the stator 30 with the rotor 40, the poles of the stator 30 are radially aligned with the magnet 42 of the rotor 40. The poles of the stator 30 generate an alternative magnetic field to thereby rotate the rotor 40. Meanwhile, the prestressing magnet 32 of the stator 30 is axially aligned with the casing 41 of the rotor 40 and provides an axial magnet force to thereby maintain dynamically balanced rotation of the rotor 40. Consequently, shift or vibration of the spindle 43 of the rotor 40 can be attenuated during rotation. When the rotor 40 is rotated, an attractive force generated between the prestressing magnet 32 and the casing 41 maintains the dynamically balanced rotation of the rotor 40 to thereby prevent vibration and noise.

Referring again to FIGS. 3 and 4, the positioning member 31 is pressed to fittingly secure the positioning member to a generally axially extending surface at a predetermined position on an outer circumference of the neck portion of the bearing 33 and determines an axial position of the prestressing magnet 32 attached thereto by adhesive. Thus in an assembling process an axial gap (b) formed between the prestressing magnet 32 and the metal casing 41 is adjustable according to product conditions. Accordingly, an axial magnetic force generated therebetween may be precisely adjusted. Preferably, the positioning member 31 and the prestressing magnet 32 are made of the same material and formed as a singular member.

Figure 5:
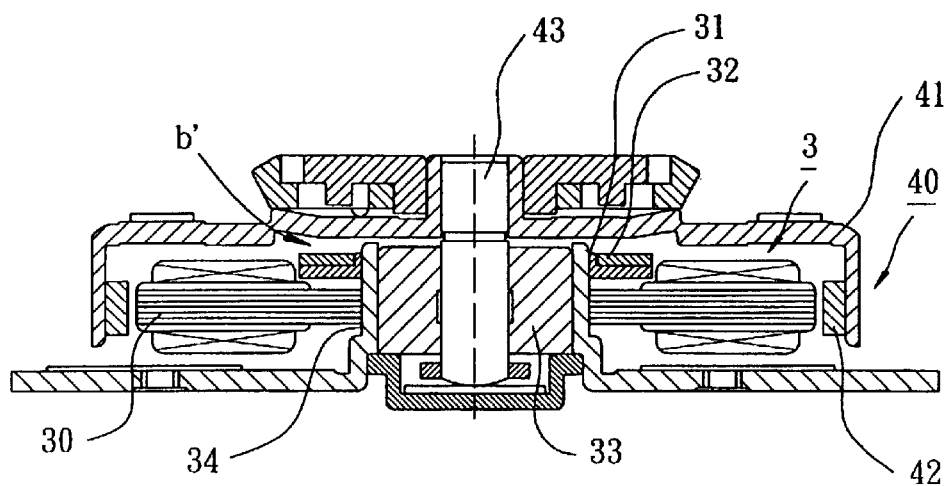
FIG. 5 is a sectional view of a positioning device for a prestressing magnet of a spindle motor in accordance with a second embodiment of the present invention.

Referring to FIG. 5, the reference numerals of a second embodiment are the same as those of the first embodiment. The stator member and the rotor member of the second embodiment have a similar configuration and the same function as those of the first embodiment and the detailed descriptions are omitted.

Referring again to FIG. 5, a spindle motor 3 of the second embodiment comprises a stator 30, a positioning member 31, a prestressing magnet 32, a bearing 33, an axial tube 34, a rotor 40, a metal casing 41 and a magnet 42. The positioning member 31 is attached to an end of the stator 30 and adapted to support the prestressing magnet 32 which is adapted to generate an axial magnetic field. Thus the metal casing 41 of the rotor 40 is attracted by a magnetic force generated by the prestressing magnet 32.

Referring again to FIG. 5, the positioning member 31 is pressed to fittingly secure the positioning member to a generally axially extending surface at a predetermined position on an outer circumference of the axial tube 34 and determines an axial position of the prestressing magnet 32 attached thereto by adhesive. Thus in an assembling process an axial gap (b') formed between the prestressing magnet 32 and the metal casing 41 is adjustable according to product conditions. Accordingly, an axial magnetic force generated therebetween may be precisely adjusted. Preferably, the positioning member 31 and the prestressing magnet 32 are made of the same material and formed as a singular member.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A spindle motor comprising:

a stator having an axial tube and a bearing contained therein, the stator further including a plurality of poles adapted to generate an alternative magnetic field;

a positioning member secured to a generally axially extending surface of the stator;

a prestressing magnet attached to the positioning member;

a rotor including a magnet adapted to actuate the alternative magnetic field; and a metal casing secured to the rotor;

wherein an axial gap formed between the prestressing magnet and the metal casing is adjusted by pressing the positioning member to be fittingly secured to a selected axial position on said generally axially extending surface of the stator, and thereby an axial magnetic force generated between the prestressing magnet and the metal casing is precisely adjusted.

2. The spindle motor as defined in claim 1, wherein the positioning member and the prestressing magnet are made of a same material and formed as a singular member.

3. The spindle motor as defined in claim 1, wherein the bearing has a neck portion at its end, and an outer circumference of said neck portion includes said generally axially extending surface adapted to fittingly secure the positioning member.

4. The spindle motor as defined in claim 1, wherein an outer circumference of said axial tube includes said generally axially extending surface adapted to fittingly secure the positioning member.

5. The spindle motor as defined in claim 1, wherein the prestressing magnet is attached to the positioning member by adhesive.

* * * * *